(12) United States Patent
Nola et al.

(10) Patent No.: US 10,094,343 B2
(45) Date of Patent: Oct. 9, 2018

(54) INTAKE MANIFOLD HAVING FAILURE CONTROLLING FEATURES

(71) Applicant: Ford Global Technologies, LLC, Dearborn, MI (US)

(72) Inventors: Gary Nola, Detroit, MI (US); Christopher William Newman, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 14/976,260

(22) Filed: Dec. 21, 2015

(65) Prior Publication Data

US 2017/0175688 A1    Jun. 22, 2017

(51) Int. Cl.
| | | |
|---|---|---|
| *B60K 5/00* | (2006.01) | |
| *F02M 35/10* | (2006.01) | |
| *F02M 35/104* | (2006.01) | |
| *B62D 21/15* | (2006.01) | |
| *F02M 35/16* | (2006.01) | |

(52) U.S. Cl.
CPC ....... *F02M 35/10242* (2013.01); *B62D 21/15* (2013.01); *F02M 35/104* (2013.01); *F02M 35/10288* (2013.01); *F02M 35/161* (2013.01)

(58) Field of Classification Search
CPC ........... F02M 35/10242; F02M 35/104; F02M 35/10288; F02M 35/161; F02M 35/0408; B62D 21/15

USPC ....... 123/184.21, 184.61, 468; 180/68.3, 232
See application file for complete search history.

(56) References Cited

U.S. PATENT DOCUMENTS

| | | |
|---|---|---|
| 5,630,387 A | 5/1997 | Kamiyama |
| 7,210,461 B2 | 5/2007 | Schreeck et al. |
| 7,997,366 B2 | 8/2011 | Tanaka |
| 8,607,756 B1 * | 12/2013 | Kulkarni ........... F02M 35/10262 123/184.21 |
| 8,967,109 B2 * | 3/2015 | Kilby ...................... F02F 7/006 123/184.21 |

FOREIGN PATENT DOCUMENTS

| | | |
|---|---|---|
| EP | 0344706 A2 | 12/1989 |
| FR | 2988648 A1 | 10/2013 |
| JP | 2009191821 A | 8/2009 |
| JP | 2012158994 A | 8/2012 |
| WO | 2014068381 A1 | 5/2014 |

* cited by examiner

*Primary Examiner* — Syed O Hasan
(74) *Attorney, Agent, or Firm* — LeClairRyan

(57) ABSTRACT

An intake manifold is provided that comprises a plurality of intake manifold runners 12, and each intake manifold runner comprises at least one elongated rib 15 and at least one elongated blister 14. The elongated rib 15 and the at least one elongated blister 14 operate together to control structural failure of the intake manifold in an impact event. Specifically, the elongated rib acts to receive and concentrate load while the at least one elongated blister provides an area of intentional failure, thus restricting the failure to a focused area on the intake manifold.

17 Claims, 4 Drawing Sheets

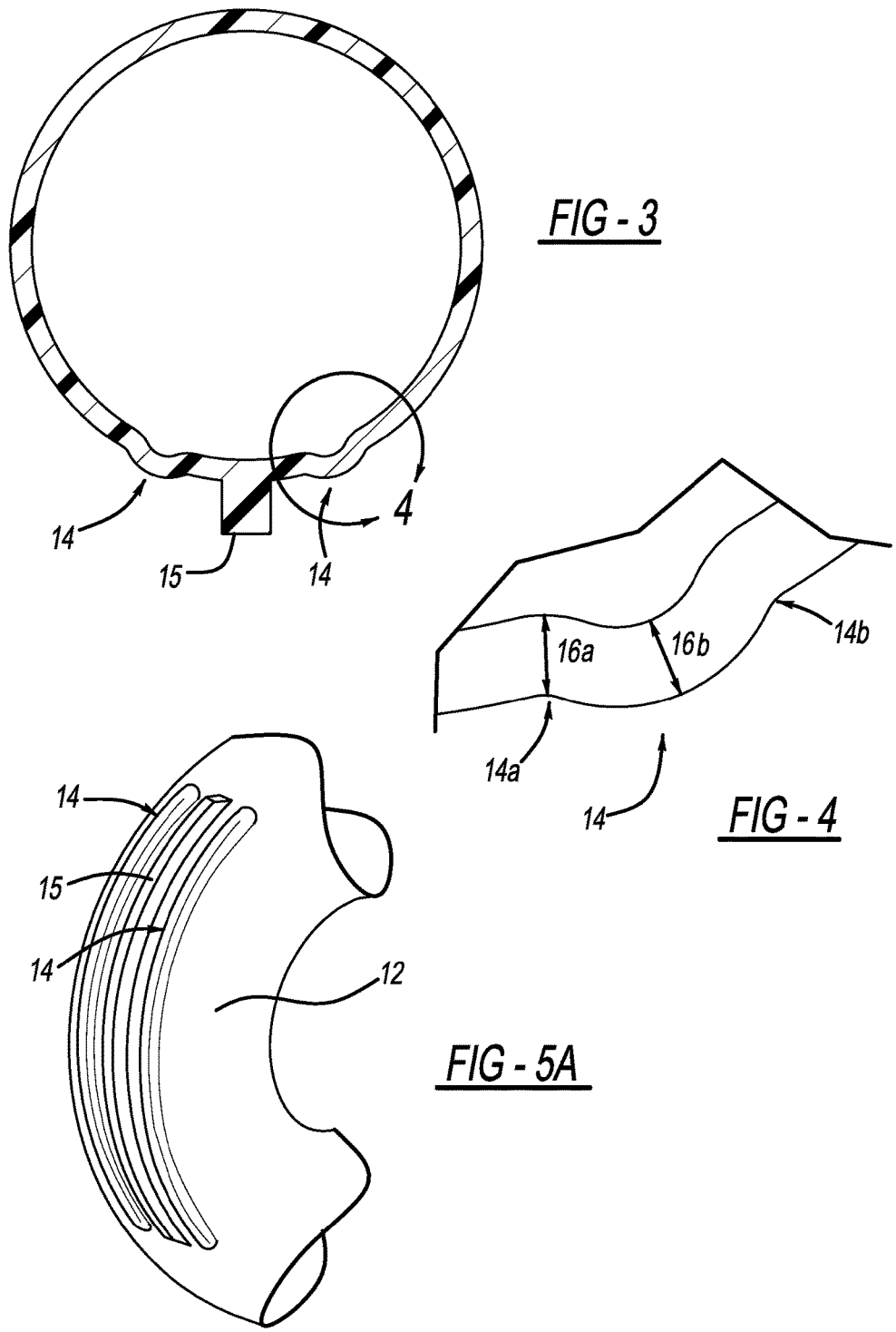

INTAKE MANIFOLD HAVING FAILURE CONTROLLING FEATURES

FIELD OF THE INVENTION

The present invention generally relates to intake manifolds, and more specifically to intake manifolds having features for receiving and concentrating a load and for providing a focused area of failure during an impact event.

BACKGROUND OF THE INVENTION

In an effort to improve passenger safety, modern automobiles employ various means to control component failure during an impact event, such as by absorbing energy. For example, crumple zones, crush cans, and the like are commonly located in the front part of automobiles to absorb energy during a head-on impact event, and they may be found in other parts of the automobile as well.

Intake manifolds having various modifications have been proposed as means for absorbing energy during an impact event. For example, U.S. Pat. No. 5,630,387 discloses an intake manifold that can be broken along fragile zones in order to absorb an impact of a crash. U.S. Pat. No. 7,997,366 discloses an intake manifold that comprises fragile or brittle parts so that the intake manifold is bent when an impact occurs at the front of the vehicle, thereby absorbing energy during an impact event. Indeed, because they have the potential to improve passenger safety, many manifolds that incorporate means for absorbing energy during an impact event have been previously proposed and disclosed.

As in so many areas of vehicle technology, there is always room for improved passenger safety.

BRIEF SUMMARY OF THE INVENTION

An object of the invention is to provide an intake manifold that has improved features for control component failure during an impact event.

The disclosed inventive concept provides an intake manifold that comprises a plurality of runners, with each runner comprising at least one elongated rib and at least one elongated blister. The elongated rib and the elongated blister operate together to control structural failure of the intake manifold in an impact event. Specifically, the elongated rib acts to receive and concentrate load while the at least one elongated blister provides an area of intentional failure, thus restricting the failure to a focused area on the intake manifold.

The above summary of the present invention is not intended to describe each embodiment or every implementation of the present invention. Advantages and attainments, together with a more complete understanding of the invention, will become apparent and appreciated by referring the attached drawings and the following detailed description of certain preferred embodiments.

BRIEF DESCRIPTION OF THE DRAWINGS

FIG. 3 is a cross-sectional view of one embodiment of an intake manifold runner according to the present invention;

FIG. 4 is a close-up view of a portion of the cross-sectional view illustrated in FIG. 3;

FIG. 5A is a partial perspective view of one embodiment of an intake manifold runner (or runner for short) according to the present invention;

DETAILED DESCRIPTION OF THE PREFERRED EMBODIMENTS

Figure 1:
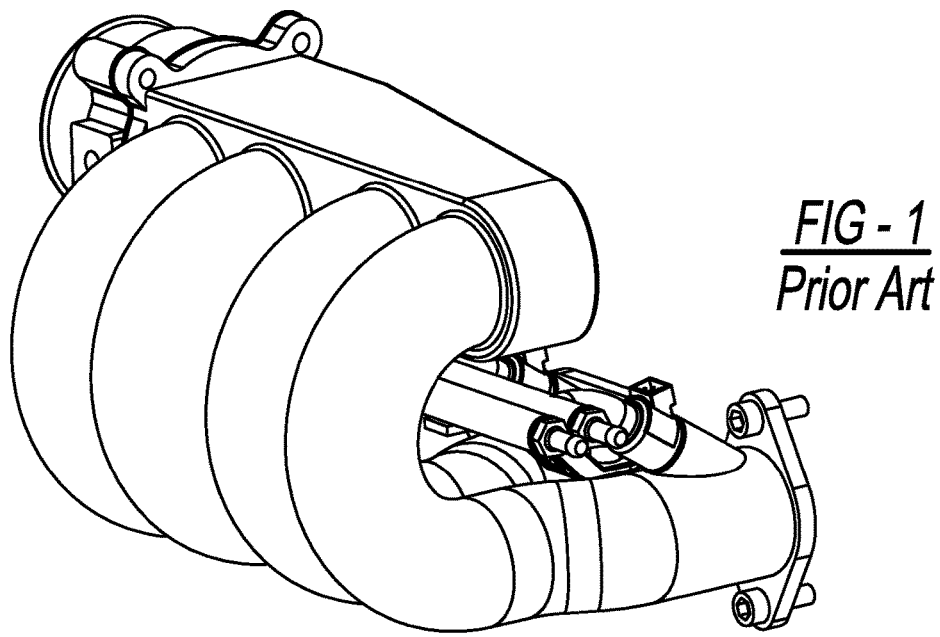
FIG. 1 is a perspective view of a prior art intake manifold, including a plenum and a plurality of intake manifold runners.

A detailed description of certain preferred embodiments of the present invention is provided in this section. The terminology used herein is for the purpose of describing particular aspects of certain preferred embodiments of the invention, and is not intended to limit the scope of the claimed invention, which will be limited only by the appended claims. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Unless defined otherwise, all technical and scientific terms used herein have the same meanings as commonly understood by a person skilled in the art to which this invention pertains.

In a preferred embodiment, the intake manifold comprises a plurality of intake manifold runners 12, with each runner comprising: an elongated rib 15 having a rib length; and an elongated blister 14 having a blister length, wherein the elongated rib and the elongated blister each extend in a direction generally parallel to a longitudinally extending axis of said runner. The elongated rib 15 acts to receive and concentrate the load applied to it during an impact event, and the elongated blister 14 provides an area of limited but intentional structural failure. In particularly preferred embodiments, the elongated blister 14 has a substantially uniform wall thickness. The substantially uniform wall thickness of the elongated blister promotes energy absorption while maintaining sufficient structural integrity to resist breaking, coming apart, or otherwise fragmenting during an impact event. That is, an elongated blister 14 having a substantially uniform wall thickness is designed with the intention to bend, but not to break. In some embodiments, the rib length is about equal to the blister length; in some embodiments, the rib length is longer than the blister length; and in some embodiments, the rib length is shorter than the blister length. In some embodiments, at least one elongated rib extends over only a longitudinally central portion of the runner. In some embodiments, at least one elongated rib extends over substantially the entire longitudinal length of the runner. In some embodiments, at least one elongated blister extends over only a longitudinally central portion of the runner. In some embodiments, at least one elongated blister extends over substantially the entire longitudinal length of the runner. Some preferred embodiments of an intake manifold may optionally include a plenum 10.

According to the invention, each runner must have at least one elongated rib 15 and must have at least one elongated blister 14. However, inclusion of at least a second elongated blister 14 in each runner, while not mandatory to the invention, is particularly preferred because, among other reasons, such an arrangement provides for a larger deformable zone that can improve failure control during an impact event.

Figure 2:
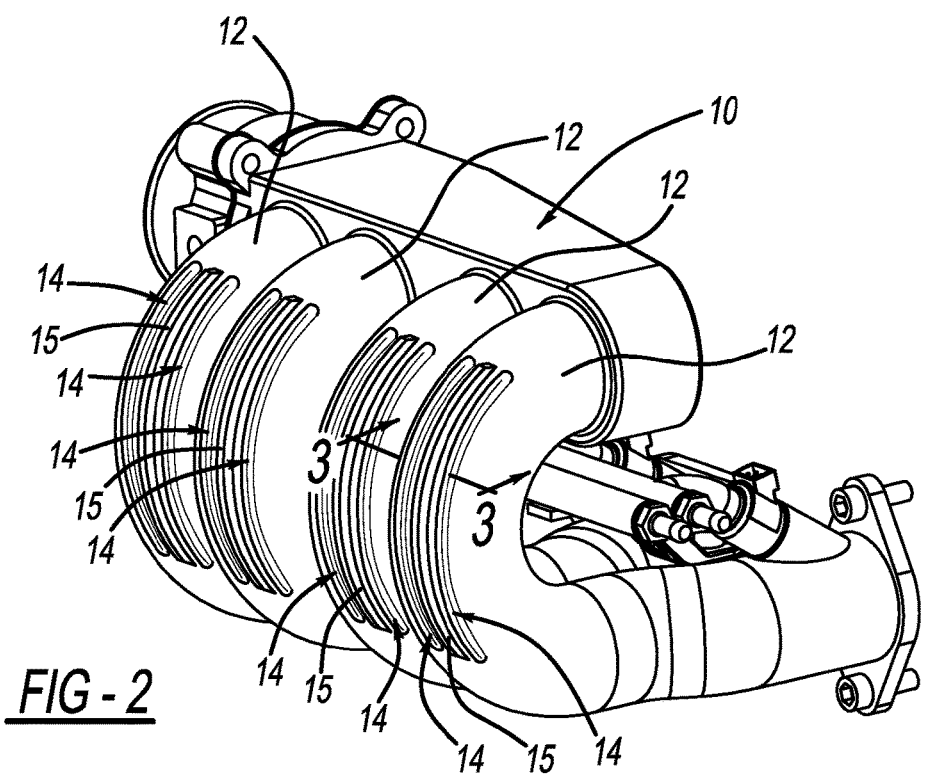
FIG. 2 is a perspective view of one embodiment of an intake manifold according to the present invention.

FIG. 2 depicts one embodiment of an intake manifold according to the present invention. The embodiment depicted in FIG. 2 comprises a plurality of runners 12, with each runner having one elongated rib 15 and two elongated blisters 14.

In a particularly preferred embodiment, an intake manifold comprises a plurality of runners 12, and each runner comprises: a first elongated rib 15 having a first rib length; a first elongated blister 14 having a first blister length; and a second elongated blister 14 having a second blister length, wherein the first elongated rib, the first elongated blister, and the second elongated blister each extend in a direction generally parallel to a longitudinally extending axis of said runner. The elongated rib 15 acts to receive and concentrate the load applied to it during an impact event, and each elongated blister 14 provides an area of limited but intentional failure.

As described for other embodiments, the substantially uniform wall thickness of the elongated blister promotes energy absorption while maintaining sufficient structural integrity to resist breaking, coming apart, or otherwise fragmenting during an impact event. In a preferred embodiment, the first rib length is about equal to the first blister length, and the first blister length is about equal to the second blister length. In some embodiments, the rib length is longer than one or both blister lengths; and in some embodiments, the rib length is shorter than one or both blister lengths. In some embodiments, at least one elongated rib extends over only a longitudinally central portion of the runner. In some embodiments, at least one elongated rib extends over substantially the entire longitudinal length of the runner. In some embodiments, at least one elongated blister extends over only a longitudinally central portion of the runner. In some embodiments, at least one elongated blister extends over substantially the entire longitudinal length of the runner.

FIG. 3 is a cross-sectional view of a preferred intake manifold runner that has one elongated rib 15 and two elongated blisters 14. The elongated rib 15 acts to receive and concentrate the load applied to it during an impact event. In particularly preferred embodiments, the elongated rib 15 protrudes from the outer surface of the intake manifold runner wall, which increases the likelihood that elongated rib 15 will be the manifold's first point of contact in during an impact event. Working in conjunction with the elongated rib, the elongated blister 14 provides an area of limited but intentional failure during an impact event. In a preferred embodiment, the elongated rib 15 protrudes from the outer surface of the intake manifold runner wall in one or more areas predicted to be among the manifold's first points of contact in during an impact event. In some embodiments, the elongated rib 15 extends the entire length, or nearly the entire length, of the intake manifold runner. The inventors of the disclosed invention have discovered that, during a crash event, an elongated blister having a substantially uniform wall thickness promotes energy absorption while maintaining sufficient structural integrity to resist breaking, coming apart, or otherwise fragmenting during that same impact event. As such, in particularly preferred embodiments, elongated blister 14 has a substantially uniform wall thickness.

FIG. 4 is a close up of one of the elongated blisters 14 depicted in FIG. 3. In the depicted embodiment, elongated blister 14, whose width spans a section of the manifold runner wall from elongated blister boundary 14a to elongated blister boundary 14b, has a substantially uniform wall thickness. For example, in the depicted embodiment, wall thickness 16a is substantially the same as wall thickness 16b. In the depicted embodiment, elongated blister 14 is concave with respect to the inner surface of the intake manifold wall, and is convex with respect to the outer surface of the intake manifold wall. However, in other embodiments, elongated blister 14 is convex with respect to the inner surface of the intake manifold wall, and is concave with respect to the outer surface of the intake manifold wall. In some preferred embodiments, the intake manifold wall has substantially uniform wall thickness at all areas except for those areas where an elongated rib extends from said wall.

In a preferred embodiment, the intake manifold runner comprises: an elongated rib 15 having a rib length; and an elongated blister 14 having a blister length, wherein the elongated rib and the elongated blister each extend in a direction generally parallel to a longitudinally extending axis of said runner. The elongated rib 15 acts to receive and concentrate the load applied to it during an impact event, and the elongated blister 14 provides an area of limited but intentional failure during an impact event. In particularly preferred embodiments, the elongated blister 14 has a substantially uniform wall thickness. As described for other embodiments, the substantially uniform wall thickness of the elongated blister promotes energy absorption while maintaining sufficient structural integrity to resist breaking, coming apart, or otherwise fragmenting during an impact event. In some embodiments, the rib length is about equal to the blister length; in some embodiments, the rib length is longer than the blister length; and in some embodiments, the rib length is shorter than the blister length. In some embodiments, at least one elongated rib extends over only a longitudinally central portion of the runner. In some embodiments, at least one elongated rib extends over substantially the entire longitudinal length of the runner. In some embodiments, at least one elongated blister extends over only a longitudinally central portion of the runner. In some embodiments, at least one elongated blister extends over substantially the entire longitudinal length of the runner.

As discussed with regard to the intake manifold depicted in FIG. 2, inclusion of at least a second elongated blister 14 in the runner, while not mandatory to the invention, is particularly preferred because, among other reasons, such an arrangement provides for a larger deformable zone that can improve failure control during an impact event.

FIG. 5A depicts one embodiment of an intake manifold runner according to the present invention. The embodiment depicted in FIG. 5A comprises an intake manifold runner having one elongated rib 15 and two elongated blisters 14.

In a particularly preferred embodiment, an intake manifold runner comprises: a first elongated rib 15 having a first rib length; a first elongated blister 14 having a first blister length; and a second elongated blister 14 having a second blister length, wherein the first elongated rib, the first elongated blister, and the second elongated blister each extend in a direction generally parallel to a longitudinally extending axis of said runner. The elongated rib 15 acts to receive and concentrate the load applied to it during an impact event, and each elongated blister 14 provides an area of limited but intentional failure during an impact event. As described for other embodiments, the substantially uniform wall thickness of the elongated blister promotes energy absorption while maintaining sufficient structural integrity to resist breaking, coming apart, or otherwise fragmenting during an impact event. In a preferred embodiment, the first rib length is about equal to the first blister length, and the first blister length is about equal to the second blister length. In some embodiments, the rib length is longer than one or both blister lengths; and in some embodiments, the rib length is shorter than one or both blister lengths. In some embodiments, at least one elongated rib extends over only a longitudinally central portion of the runner. In some embodiments, at least one elongated rib extends over substantially the entire longitudinal length of the runner. In some embodiments, at least one elongated blister extends over only a longitudinally central portion of the runner. In some embodiments, at least one elongated blister extends over substantially the entire longitudinal length of the runner.

Figure 5B:
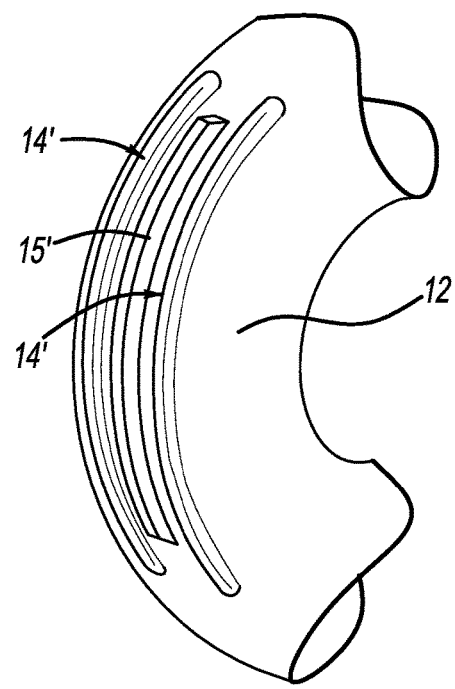
FIG. 5B is a perspective view of an alternative embodiment of an intake manifold runner according to the present invention.
Figure 5C:
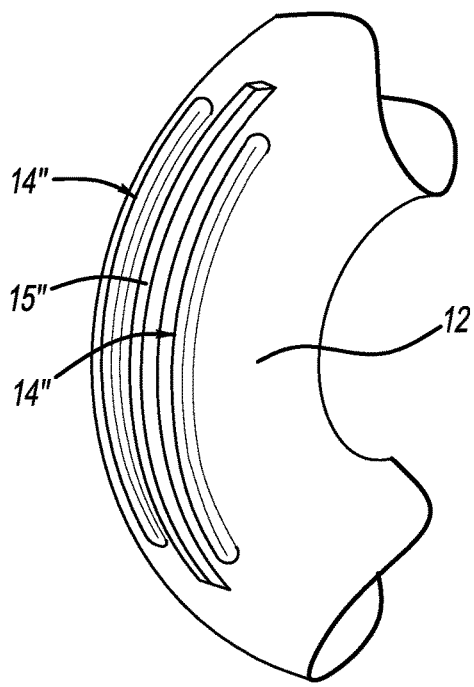
FIG. 5C is a perspective view of another alternative embodiment of an intake manifold runner according to the present invention.
Figure 5D:
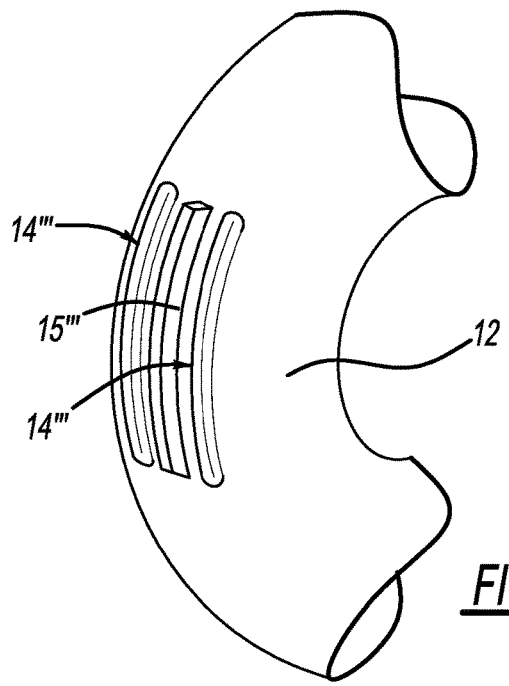
FIG. 5D is a perspective view of another alternative embodiment of an intake manifold runner according to the present invention.
Figure 6:
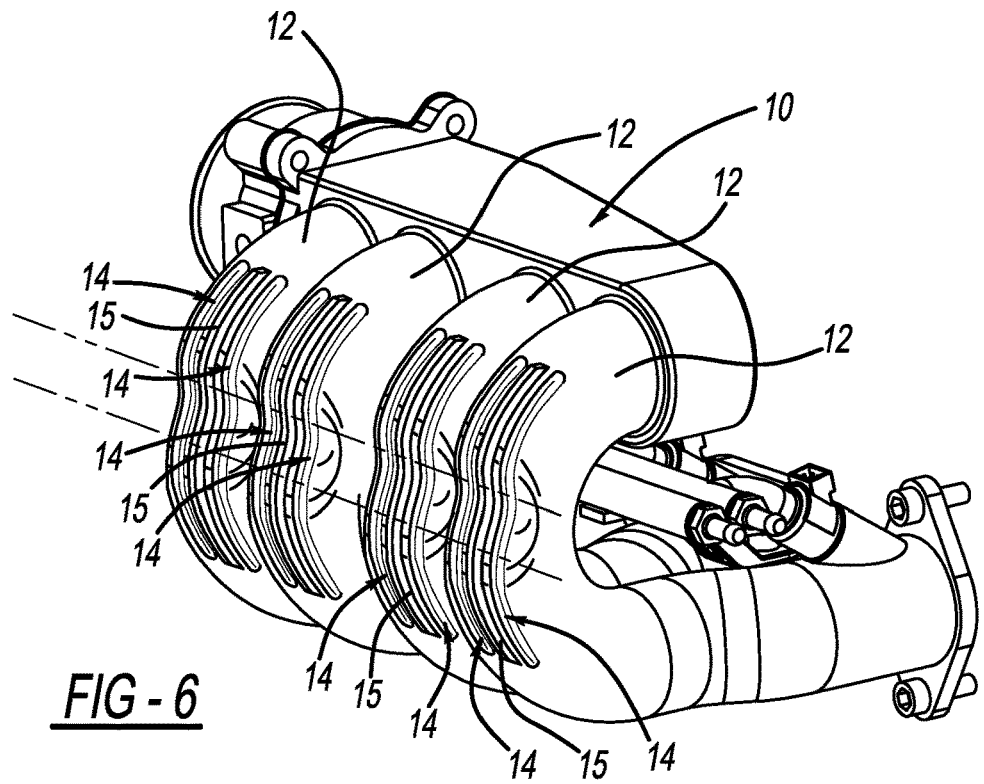
FIG. 6 is a perspective view illustrating how the embodiment shown in FIG. 2 is predicted to appear after an impact event.
Figure 7:
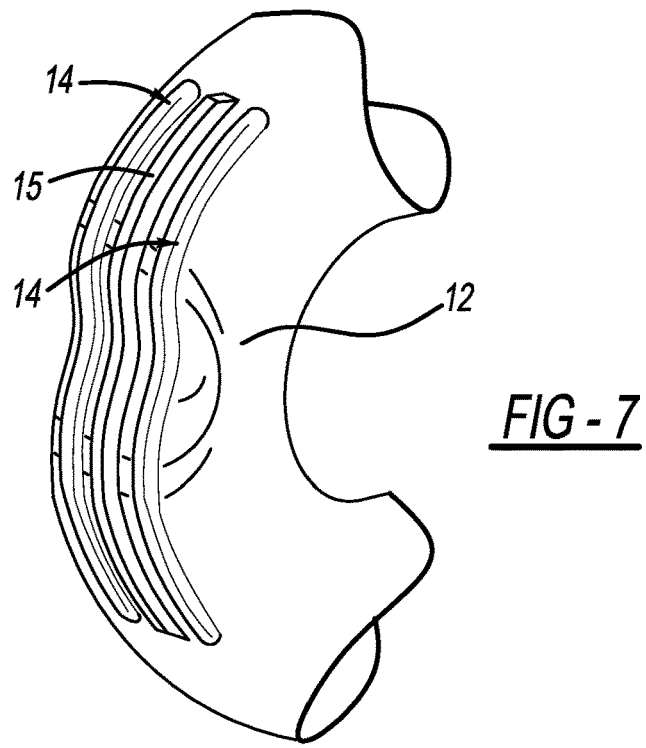
FIG. 7 is a perspective view illustrating how the embodiment shown in FIG. 5A is predicted to appear after an impact event.

FIGS. 5B, 5C, and 5D depict various alternative embodiments of the intake manifold runner depicted in FIG. 5A. In FIG. 5B, the elongated blisters 14' are longer than the elongated rib 15'. In FIG. 5C, the elongated blisters 14" are shorter than the elongated rib 15". In FIG. 5D, elongated blisters 14' are about the same length as the elongated rib 15'''. However, the elongated blisters 14''' and elongated rib 15''' of intake manifold runner depicted FIG. 5D are shorter than the corresponding elongated blisters 14 and elongated rib 15 of intake manifold runner depicted FIG. 5D.

It will be appreciated that aspects of the intake manifold and intake manifold runners may be varied without departing from the present disclosure. For example, the geometric arrangement, density, length and height of elongated ribs and elongated blisters may be further varied. Still further, the runners and other components may be comprised of metallic materials, including metallic alloys, and/or composite materials, including one or more of plastics, resins, and polymers, though other materials may be used.

It will be also appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. An intake manifold comprising a plurality of runners, each runner having a longitudinally extending axis, an inner surface, an inner side, and an outer side opposite said inner side, each runner comprising: a pair of elongated blisters, each of said blisters having a first blister end, a second blister end, and a blister length extending therebetween, each of said blister lengths being the same and concave with respect to the inner surface of the runner; and an elongated rib having a first rib end, a second rib end, and a rib length extending therebetween, said elongated rib being positioned between said elongated blisters, said rib length being equal to said blister length, wherein said elongated rib and said pair of elongated blisters each extend in a direction generally parallel to the longitudinally extending axis of the runner, and wherein said pair of elongated blisters and said elongated rib are formed on said outer side of the runner.

2. The intake manifold of claim 1, wherein the elongated blister has a substantially uniform wall thickness.

3. The intake manifold of claim 1, wherein said elongated rib extends along the entire longitudinal extending axis of the runner.

4. The intake manifold of claim 2, wherein said elongated rib extends along the entire longitudinal extending axis of the runner.

5. The intake manifold of claim 1, wherein said elongated rib protrudes radially outwardly from the runner more than that of said elongated blisters.

6. The intake manifold of claim 2, wherein said elongated rib protrudes radially outwardly from the runner more than that of said elongated blisters.

7. An intake manifold runner having a longitudinally extending axis, an inner surface, an inner side, and an outer side, the intake manifold runner comprising: a pair of elongated blisters, each of said blisters having a first blister end, a second blister end, and a blister length extending therebetween, each of said blister lengths being the same and concave with respect to the inner surface of the intake manifold runner; and an elongated rib having a first rib end, a second rib end, and a rib length extending therebetween, said elongated rib being positioned between said elongated blisters, said rib length being longer than said blister length; and wherein said elongated rib and said pair of elongated blisters each extend in a direction generally parallel to the longitudinally extending axis of the intake manifold runner, wherein said pair of elongated blisters and said elongated rib are formed on said outer side of the intake manifold runner.

8. An intake manifold comprising the intake manifold runner of claim 7.

9. The intake manifold runner of claim 7, wherein said pair of elongated blisters has a uniform wall thickness.

10. The intake manifold runner of claim 7, wherein said elongated rib extends along the entire longitudinal extending axis of the runner.

11. The intake manifold of claim 7, wherein said elongated rib protrudes radially outwardly from the runner more than that of said elongated blisters.

12. An intake manifold comprising a plurality of the intake manifold runner of claim 7.

13. An intake manifold runner having a longitudinally extending axis, an inner surface, an inner side, and an outer side, the intake manifold runner including: a pair of elongated blisters, each of said blisters having a first blister end, a second blister end, and a blister length extending therebetween, each of said blister lengths being the same and concave with respect to the inner surface of the intake manifold runner; and an elongated rib having a first rib end, a second rib end, and a rib length extending therebetween, said elongated rib being positioned between said elongated blisters, said rib length being shorter than said blister length; wherein said elongated rib and said pair of elongated blisters each extend in a direction generally parallel to the longitudinally extending axis of the intake manifold runner, and wherein said pair of elongated blisters and said elongated rib are formed on said outer side of the intake manifold runner.

14. An intake manifold comprising the intake manifold runner of claim 13.

15. The intake manifold runner of claim 13, wherein said pair of elongated blisters has a uniform wall thickness.

16. The intake manifold of claim 13, wherein said elongated rib protrudes radially outwardly from the runner more than that of said elongated blisters.

17. An intake manifold comprising a plurality of the intake manifold runner of claim 13.

\* \* \* \* \*